United States Patent
Han et al.

(10) Patent No.: US 10,574,290 B2
(45) Date of Patent: Feb. 25, 2020

(54) METHOD AND DEVICE FOR TRANSMITTING INFORMATION

(71) Applicant: ZTE Corporation, Shenzhen (CN)

(72) Inventors: Xianghui Han, Shenzhen (CN); Shuqiang Xia, Shenzhen (CN); Bo Dai, Shenzhen (CN); Wen Zhang, Shenzhen (CN); Jing Shi, Shenzhen (CN); Qian Dai, Shenzhen (CN); Wei Gou, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/757,892

(22) PCT Filed: Sep. 5, 2016

(86) PCT No.: PCT/CN2016/098088
§ 371 (c)(1),
(2) Date: Mar. 6, 2018

(87) PCT Pub. No.: WO2017/036419
PCT Pub. Date: Mar. 9, 2017

(65) Prior Publication Data
US 2019/0081660 A1 Mar. 14, 2019

(30) Foreign Application Priority Data

Sep. 6, 2015 (CN) .......................... 2015 1 0561005

(51) Int. Cl.
H04L 5/00 (2006.01)
H04B 1/7143 (2011.01)
(Continued)

(52) U.S. Cl.
CPC ........ *H04B 1/7143* (2013.01); *H04J 13/0062* (2013.01); *H04L 5/00* (2013.01);
(Continued)

(58) Field of Classification Search
None
See application file for complete search history.

(56) References Cited

U.S. PATENT DOCUMENTS 8,885,743 B2 11/2014 Kwak et al.
2008/0318608 A1* 12/2008 Inoue .................... H04B 1/707
455/509

(Continued)

FOREIGN PATENT DOCUMENTS

CN 101826948 A 9/2010
CN 102064921 A 5/2011
(Continued)

OTHER PUBLICATIONS

English Translation of International Search Report in international application No. PCT/CN2016/098088, dated Nov. 28, 2016.
(Continued)

Primary Examiner — Kodzovi Acolatse
(74) Attorney, Agent, or Firm — Li & Cai Intellectual Property (USA) Office

(57) ABSTRACT

A method and device for transmitting information, comprising: firstly, determining a predefined pattern for carrying information; wherein the predefined pattern comprises a predefined sequence, or the time-frequency structure of a predefined reference symbol (RS), and the information comprises an acknowledgment message (ACK) or a non-acknowledgment message (NACK); and then transmitting the predefined pattern carrying the information on a preset time-frequency domain resource.

15 Claims, 6 Drawing Sheets

---

101
determine a predefined pattern for carrying information, the predefined pattern includes a predefined sequence or a predefined RS time frequency structure 102
transmit the predefined pattern carrying the information on a preset time-frequency domain resource

(51) Int. Cl.
*H04J 13/00* (2011.01)
*H04L 27/20* (2006.01)
*H04L 27/26* (2006.01)
*H04W 72/04* (2009.01)

(52) U.S. Cl.
CPC .......... *H04L 5/0048* (2013.01); *H04L 5/0055* (2013.01); *H04L 5/0064* (2013.01); *H04L 27/2082* (2013.01); *H04L 27/2607* (2013.01); *H04L 27/2613* (2013.01); *H04W 72/0413* (2013.01); *H04L 5/0005* (2013.01)

(56) References Cited

U.S. PATENT DOCUMENTS

| | | | |
|---|---|---|---|
| 2010/0103902 A1* | 4/2010 | Kim | H04L 5/0048 370/330 |
| 2010/0177804 A1 | 7/2010 | Kwak | |
| 2011/0051621 A1 | 3/2011 | Kwak | |
| 2011/0080876 A1 | 4/2011 | Yin | |
| 2011/0080880 A1 | 4/2011 | Yin | |
| 2011/0090825 A1 | 4/2011 | Papasakellariou | |
| 2011/0188447 A1* | 8/2011 | Wang | H04L 5/0053 370/328 |
| 2011/0305179 A1* | 12/2011 | Wang | H04L 1/0031 370/311 |
| 2012/0320859 A1 | 12/2012 | Ahn | |
| 2013/0077571 A1* | 3/2013 | Papasakellariou | H04W 52/325 370/328 |
| 2013/0136083 A1 | 5/2013 | Yin | |
| 2013/0148612 A1 | 6/2013 | Kwak et al. | |
| 2014/0169310 A1* | 6/2014 | Ma | H04W 56/002 370/329 |
| 2014/0185539 A1* | 7/2014 | Seo | H04B 7/2656 370/329 |
| 2014/0233506 A1 | 8/2014 | Papasakellariou et al. | |
| 2015/0003263 A1* | 1/2015 | Senarath | H04L 5/0051 370/252 |
| 2015/0023312 A1 | 1/2015 | Kwak et al. | |
| 2015/0365880 A1* | 12/2015 | Malladi | H04L 5/0007 370/312 |
| 2016/0094327 A1 | 3/2016 | Han et al. | |
| 2016/0226639 A1* | 8/2016 | Xiong | H04L 5/0053 |
| 2016/0270109 A1* | 9/2016 | Jiang | H04W 72/1268 |
| 2016/0323874 A1* | 11/2016 | Pajukoski | H04L 5/001 |
| 2016/0380741 A1 | 12/2016 | Papasakellariou et al. | |
| 2017/0006652 A1* | 1/2017 | Lee | H04W 72/08 |
| 2017/0041103 A1* | 2/2017 | Maattanen | H04L 1/1671 |
| 2017/0093545 A1* | 3/2017 | Kadous | H04L 5/0055 |
| 2018/0007562 A1* | 1/2018 | Auer | H04W 16/32 |
| 2018/0062816 A1 | 3/2018 | Papasakellariou et al. | |
| 2018/0191483 A1* | 7/2018 | Yamazaki | H04L 5/14 |
| 2018/0199322 A1* | 7/2018 | Takeda | H04J 11/00 |
| 2018/0213530 A1* | 7/2018 | Mochizuki | H04W 72/12 |
| 2018/0270722 A1* | 9/2018 | Kim | H04W 36/00 |
| 2018/0359745 A1* | 12/2018 | Yeo | H04L 1/18 |
| 2019/0052437 A1* | 2/2019 | Han | H04L 1/1671 |
| 2019/0081660 A1* | 3/2019 | Han | H04L 5/00 |

FOREIGN PATENT DOCUMENTS

| | | |
|---|---|---|
| CN | 102118782 A | 7/2011 |
| CN | 102710397 A | 10/2012 |
| CN | 103427940 A | 12/2013 |
| CN | 103546253 A | 1/2014 |
| CN | 103973397 A | 8/2014 |
| EP | 2230875 A2 | 9/2010 |
| EP | 2600581 A2 | 6/2013 |
| WO | 2011019795 A1 | 2/2011 |

OTHER PUBLICATIONS

English Translation of the Written Opinion of the International Search Authority in international application No. PCT/CN2016/098088, dated Nov. 28, 2016.
Supplementary European Search Report in European application No. 16840848.2, dated Aug. 27, 2018.
NTT Docomo et al:"sPUCCH for shortened TTI", 3GPP Draft; RI-165212, 3rd Generation Partnership Project (3GPP), Mobile Competence Centre; 650, Route Des Lucioles; F-06921 Sophia-Antipolis Cedex; France, vol. RAN WG1, No. Nanjing; May 23, 2016-May 27, 2016 May 14, 2016 (May 14, 2016), XP051096208 ,Retrieved from the Internet: URL: http://www.3gpp.org/flp/tsg_ran/WG1_RL1/TSGR1_85/Doc [retrieved on May 14, 2016] * the whole document *.

* cited by examiner

METHOD AND DEVICE FOR TRANSMITTING INFORMATION

TECHNICAL FIELD

The disclosure relates to, but not limited to a wireless communication technology, and in particular to a method and device for transmitting information.

BACKGROUND

The rapid development of the mobile internet and the internet of things trigger explosive increase of data traffic and extensive appearance of diversified and differentiated services. The fifth generation mobile communication technology (5G), serving as a new generation mobile communication technology, will support a higher rate, a huge number of links, an ultralow delay, higher reliability, hundredfold increase of energy efficiency and the like so as to support requirement changes. The ultralow delay, serving as a key index of the 5G technology, directly affects development of delay-limited services such as car networking, industrial automation, remote control and smart grids. A current series of standard researches on 5G delay reduction is promoting gradually.

The reduction of a Transmission Time Interval (TTI), serving as an important research direction of delay reduction, aims to reduce the length of a current TTI of 1 ms to 0.5 ms or even 1 to 2 symbols, thereby shortening minimum scheduling time exponentially. Thus, a single transmission delay can be reduced exponentially without changing the frame structure.

However, when the length of the TTI is reduced to a length of 1 to 7 symbols, the transmission structure of a related Physical Uplink Control Channel (PUCCH) for sending an Acknowledgement (ACK) and a Negative Acknowledgement (NACK) cannot be directly used. Meanwhile, shortening of the TTI in time domain will affect the demodulation performance of transmitted information, and the related PUCCH is in shortage of frequency domain diversity due to occupancy of only one Physical Resource Block (PRB) in frequency domain. In addition, reduction of the number of symbols within the TTI will cause reduction of available resources for transmitting valid data due to excessive overheads of a Reference Symbol (RS).

SUMMARY

The following is a brief introduction for a subject described herein in detail. The brief introduction is not intended to restrict the scope of protection of claims.

Embodiments of the disclosure provide a method and device for transmitting information, which is capable of transmitting ACK/NACK even when the length of a TTI is shortened in time domain, is convenient for a receiver to demodulate a predefined pattern without reference information, can easily achieve a hopping gain, and is capable of implicitly transmitting information by fully utilizing the positions of RSs to improve the utilization rate of resources.

The embodiments of the disclosure provide a method for transmitting information. The method includes the steps as follows.

A predefined pattern for carrying information is determined, wherein the predefined pattern includes a predefined sequence or a predefined RS time frequency structure.

The predefined pattern carrying the information is transmitted on a preset time-frequency domain resource.

The information includes ACK or NACK.

Alternatively, when the predefined pattern is the predefined sequence, the preset time-frequency domain resource includes a preset time domain resource and a preset frequency domain resource, wherein the preset time domain resource includes a TTI with a duration of K symbols, where K is greater than of equal to 1 and smaller than or equal to 7, and K is a positive integer; and the preset frequency domain resource includes M subcarriers, the M subcarriers being mapped as a comb structure in frequency domain, wherein a frequency domain offset number N is an integral multiple of 2, and M is an integral multiple of 12.

Alternatively, M is 48 or 72.

Alternatively, the predefined sequence has a length L, which is an integral multiple of 12, a basic sequence of the predefined sequence includes a Quadrature Phase Shift Keying (QPSK)-based sequence or a Zadoff-Chu (ZC) sequence, and a sequence in the predefined sequence is obtained based on the basic sequence.

Alternatively, when L is greater than 24, the basic sequence of the predefined sequence is the ZC sequence.

Alternatively, L is 24 or 36.

When L is 24, the basic sequence of the predefined sequence is the QPSK-based sequence.

When L is 36, the basic sequence of the predefined sequence is the ZC sequence.

Alternatively, the step that the predefined pattern carrying the information is transmitted on a preset time-frequency domain resource includes the sub-steps as follows.

The predefined sequence is transmitted according to a first preset rule by using the M subcarriers at the TTI with the duration of K symbols.

Herein, the first preset rule includes:

for each of the K symbols, using a different basic sequence for a corresponding predefined sequence to be transmitted in the symbol; or, for each of the K symbols, obtaining a corresponding predefined sequence to be transmitted in the symbol by performing a different cyclic shift on a same basic sequence.

The first preset rule may further include:

for each of the K symbols, using a different comb subcarrier offset of the M subcarriers; or, for each of the K symbols, using a same frequency domain subcarrier position; or, for the K symbols, using inter-symbol frequency hopping.

Alternatively, the step that the predefined pattern carrying the information is transmitted on a preset time-frequency domain resource includes the sub-step as follows.

The predefined sequence is transmitted for each symbol of K symbols in the TTI in the following manner: transmitting the predefined sequence by using the M subcarriers in a preset 1-symbol duration.

Alternatively, the preset time domain resource is a TTI having a 1-symbol length, and when a Sounding Reference Signal (SRS) is sent at frequency domain positions Y whilst the information is sent at frequency domain positions X, the step that the predefined pattern carrying the information is transmitted on a preset time-frequency domain resource includes the sub-step as follows.

The information is sent at a frequency domain position Y or a subset of Y within the TTI having a 1-symbol length.

Herein, one or more sequences transmitted at the frequency domain positions Y or the subset of Y and used for carrying the information are sequences used for transmitting the information at frequency domain positions X, or a repetition of sequences used for transmitting the information at frequency domain positions X, or truncation of sequences used for transmitting the information at frequency domain positions X, or punching of sequences used for transmitting the information at frequency domain positions X, or redefined sequences.

Alternatively, an index of the basic sequence is acquired in at least one of the following manners: allocation by a base station; calculation according to a physical layer cell identity of a cell; obtaining according to a timeslot index; and obtaining according to an index of the TTI.

An index of the cyclic shift is acquired in at least one of the following manners: allocation by a base station; calculation according to a physical layer cell identity of a cell; calculation according to a Cell Radio Network Temporary Identity (C-RNTI) allocated to a User Equipment (UE) by a cell; obtaining according to a timeslot index; and obtaining according to an index of the TTI.

Alternatively, when the predefined pattern is an RS time frequency structure, the step that the predefined pattern carrying the information is transmitted on a preset time-frequency domain resource includes the sub-step as follows.

The RS is sent by at least using a symbol duration, the RS time frequency structure being used to represent ACK information or NACK information in the information, wherein the RS time frequency structure includes: different symbol positions used by RSs in time domain, or different contiguous subcarrier positions in frequency domain, or different comb subcarrier offsets in frequency domain.

Alternatively, the method may further include the step as follows.

Channel state information is transmitted on the preset time-frequency domain resource, the channel state information including: Channel Quality Indicator (CQI), Precoding Matrix Indicator (PMI) and Rank Indication (RI).

Herein, when at least one piece of information included in the channel state information and ACK or NACK included in the information are transmitted simultaneously, independent coding modulation or joint coding modulation is used.

The embodiments of the disclosure also provide an information transmission device. The device includes:

a determination unit, arranged to determine a predefined pattern for carrying information, wherein the predefined pattern includes a predefined sequence or a predefined RS time frequency structure; and a transmission unit, arranged to transmit the predefined pattern carrying the information on a preset time-frequency domain resource.

The information includes ACK or NACK.

Alternatively, when the predefined pattern is the predefined sequence, the preset time-frequency domain resource includes a preset time domain resource and a preset frequency domain resource, wherein the preset time domain resource includes a TTI with a duration of K symbols, where K is greater than of equal to 1 and smaller than or equal to 7, and K is a positive integer; and the preset frequency domain resource includes M subcarriers, the M subcarriers being mapped as a comb structure in frequency domain, wherein a frequency domain offset number N is an integral multiple of 2, and M is an integral multiple of 12.

Alternatively, M is 48 or 72.

Alternatively, the predefined sequence has a length L, which is an integral multiple of 12, a basic sequence of the predefined sequence includes a QPSK-based sequence or a ZC sequence, and a sequence in the predefined sequence is obtained based on the basic sequence.

Alternatively, when L is greater than 24, the basic sequence of the predefined sequence is the ZC sequence.

Alternatively, L is 24 or 36.

When L is 24, the basic sequence of the predefined sequence is the QPSK-based sequence.

When L is 36, the basic sequence of the predefined sequence is the ZC sequence.

Alternatively, the transmission unit is arranged to transmit the predefined sequence carrying the information on a preset time-frequency domain resource in the following manner:

transmitting the predefined sequence according to a first preset rule by using the M subcarriers at the TTI with the duration of K symbols.

Herein, the first preset rule includes:

for each of the K symbols, using a different basic sequence for a corresponding predefined sequence to be transmitted in the symbol; or, for each of the K symbols, obtaining a corresponding predefined sequence to be transmitted in the symbol by performing a different cyclic shift on a same basic sequence.

The first preset rule may further include:

for each of the K symbols, using a different comb subcarrier offset of the M subcarriers; or, for each of the K symbols, using a same frequency domain subcarrier position; or, for the K symbols, using inter-symbol frequency hopping.

Alternatively, the transmission unit is arranged to transmit the predefined sequence carrying the information on a preset time-frequency domain resource in the following manner:

for each of the K symbols in the TTI, transmitting the predefined sequence in the following manner: transmitting a corresponding predefined sequence by using the M subcarriers in a preset 1-symbol duration.

Alternatively, the preset time domain resource is a TTI having a 1-symbol length, and when a Sounding Reference Signal (SRS) is sent at frequency domain positions Y whilst the information is sent at frequency domain positions X, the transmission unit is arranged to transmit the predefined sequence carrying the information on a preset time-frequency domain resource in the following manner:

sending the information at the frequency domain positions Y or a subset of Y within the TTI of the 1-symbol length.

Herein, one or more sequences transmitted at the frequency domain positions Y or the subset of Y and used for carrying the information are sequences used for transmitting the information at frequency domain positions X, or a repetition of sequences used for transmitting the information at frequency domain positions X, or truncation of sequences used for transmitting the information at frequency domain positions X, or punching of sequences used for transmitting the information at frequency domain positions X, or redefined sequences.

Alternatively, an index of the basic sequence is acquired in at least one of the following manners: allocation by a base station; calculation according to a physical layer cell identity of a cell, obtaining according to a timeslot index; and obtaining according to an index of the TTI.

An index of the cyclic shift is acquired in at least one of the following manners: allocation by a base station; calculation according to a physical layer cell identity of a cell; calculation according to a C-RNTI allocated to a UE by a cell; obtaining according to a timeslot index; and obtaining according to an index of the TTI.

Alternatively, when the predefined pattern is a predefined RS time frequency structure, the transmission unit is arranged to transmit the predefined sequence carrying the information on a preset time-frequency domain resource in the following manner:

sending the RS in at least a 1-symbol duration, the RS time frequency structure indicates ACK information or NACK information in the information, wherein the RS time frequency structure comprises: different symbol positions used by RSs in time domain, or different contiguous subcarrier positions in frequency domain, or different comb subcarrier offsets in frequency domain.

Alternatively, the transmission unit may be further arranged to:

transmit channel state information on the preset time-frequency domain resource, the channel state information including at least one of the following: CQI, PMI, or RI.

Herein, when at least one piece of information included in the channel state information and ACK or NACK included in the information are transmitted simultaneously, independent coding modulation or joint coding modulation is used.

According to an information transmission method and device provided in the embodiments of the disclosure, firstly, a predefined pattern for carrying information is determined, the predefined pattern includes a predefined sequence or a predefined RS time frequency structure; and then, the predefined pattern carrying the information is transmitted on a preset time-frequency domain resource. By means of the embodiments of the disclosure, ACK/NACK can be transmitted even when the length of a TTI is shortened in time domain, it is convenient for a receiver to demodulate a predefined pattern without reference information, a hopping gain can be easily achieved, and information can be implicitly transmitted by fully utilizing the positions of RSs to improve the utilization rate of resources.

After the drawings and the detailed descriptions are read and understood, other aspects may be understood.

DETAILED DESCRIPTION

The embodiments of the disclosure will be described below in conjunction with the drawings in detail. It is to be noted that the embodiments in the present application and the features in the embodiments may be randomly combined with each other without conflicts.

Steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

Figure 1:
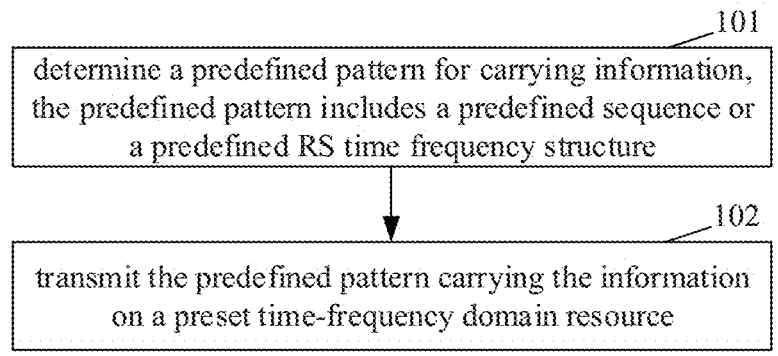
FIG. 1 is a flowchart of a method for transmitting information according to embodiments of the disclosure.

The embodiments of the disclosure provide a method for transmitting information. As shown in FIG. 1, the method, based on a UE side, includes the steps as follows.

In step 101, a predefined pattern for carrying information is determined. The predefined pattern includes a predefined sequence or a predefined RS time frequency structure.

In step 102, the predefined pattern carrying the information is transmitted on a preset time-frequency domain resource.

The information includes ACK or NACK.

Alternatively, when the predefined pattern is the predefined sequence, the preset time-frequency domain resource includes a preset time domain resource and a preset frequency domain resource; the preset time domain resource includes a TTI with a duration of K symbols, wherein K is greater than of equal to 1 and smaller than or equal to 7, and K is a positive integer; and the preset frequency domain resource includes M subcarriers, the M subcarriers being mapped as a comb structure in frequency domain, wherein a frequency domain offset number N is an integral multiple of 2, and M is an integral multiple of 12. Alternatively, M may be 48 of 72.

The frequency domain offset refers to an offset of an initial subcarrier index relative to a lowest index of a corresponding resource block when M subcarriers are mapped to a comb structure in frequency domain, and the frequency domain offset number is a total number of all possible offsets. For example, when a subcarrier is used as a mapping interval, namely when one of every two subcarriers is mapped, the frequency domain offset number is 2, and the frequency domain offset is 0 or 1.

Alternatively, the predefined sequence has a length L, which is an integral multiple of 12, a basic sequence of the predefined sequence includes a QPSK-based sequence or a ZC sequence, and a sequence in the predefined sequence is obtained based on the basic sequence.

Alternatively, when L is greater than 24, the basic sequence of the predefined sequence is the ZC sequence.

Alternatively, L is 24 or 36.

When L is 24, the basic sequence of the predefined sequence is the QPSK-based sequence.

When L is 36, the basic sequence of the predefined sequence is the ZC sequence.

Alternatively, step 102 may include the sub-step as follows.

The predefined sequence is transmitted according to a first preset rule by using the M subcarriers at the TTI with the duration of K symbols.

Herein, the first preset rule includes:

for each of the K symbols, using a different basic sequence for a corresponding predefined sequence to be transmitted in the symbol; or, for each of the K symbols, obtaining a corresponding predefined sequence to be transmitted in the symbol by performing a different cyclic shift on a same basic sequence.

Alternatively, the first preset rule further includes:

for each of the K symbols, using a different comb subcarrier offset of the M subcarriers; or, for each of the K symbols, using a same frequency domain subcarrier position; or, for the K symbols, using inter-symbol frequency hopping.

Alternatively, step 102 may include the sub-step as follows.

The predefined sequence is transmitted for each symbol of K symbols in the TTI in the following manner: transmitting the predefined sequence by using the M subcarriers in a preset 1-symbol duration.

Alternatively, the preset time domain resource is a TTI having a 1-symbol length, and when a UE needs to send an SRS at frequency domain positions Y whilst needing to send the information at frequency domain positions X, step 102 may include the sub-step as follows.

The information is sent at frequency domain positions Y or a subset of Y within the TTI having a 1-symbol length.

Herein, one or more sequences transmitted at the frequency domain positions Y or the subset of Y and used for carrying the information are sequences used for transmitting the information at frequency domain positions X, or a repetition of sequences used for transmitting the information at frequency domain positions X, or truncation of sequences used for transmitting the information at frequency domain positions X, or punching of sequences used for transmitting the information at frequency domain positions X, or redefined sequences.

It is worth mentioning that in the related technical solution, when a UE needs to send ACK/NACK and SRSs simultaneously, an SRS is sent at a frequency domain position Q in the last symbol of a subframe, and an SRS is sent at a frequency domain position P in all other symbols of the subframe. Here, the frequency domain position P and the frequency domain position Q are not intersected. However, in the technical solution provided in the embodiments of the disclosure, a sequence for carrying ACK/NACK is sent at frequency domain positions Y or a subset of Y in the same symbol. Compared with the related technical solution, the present solution of the disclosure implements a scenario where ACK/NACK and SRSs are transmitted within the same symbol when a TTI is reduced to a 1-symbol length, and further points out that the ACK/NACK and the SRSs are sent at the frequency domain position Q for sending SRSs instead of the frequency domain position P for sending ACK/NACK, so that functions of the SRSs and feedback for the ACK/NACK can be implemented simultaneously, and the SRSs are not sent any longer. Thus, because both SRSs and ACK/NACK adopt a comb structure in frequency domain, sending of the SRSs is eliminated, and the ACK/NACK can be sent.

It addition, it is to be noted that the redefined sequence may be a sequence determined by a person skilled in the art and having good self-correlation, low cross correlation and a low peak-to-average ratio. For example, the redefined sequence is defined as double repetition for sending, at frequency domain positions Y, a sequence (assumed to be defined as a sequence A) used for transmitting the information at frequency domain positions X, the sequence A may be sent at even subcarrier positions of the frequency domain positions Y, an inverted sequence of the sequence A is sent at odd subcarrier positions of the frequency domain positions Y, and it may be ensured that the redefined sequence has a low peak-to-average ratio.

Alternatively, an index of the basic sequence is acquired in at least one of the following manners: allocation by a base station; calculation according to a physical layer cell identity of a cell; obtaining according to a timeslot index; and obtaining according to an index of the TTI.

An index of the cyclic shift is acquired in at least one of the following manners: allocation by a base station; calculation according to a physical layer cell identity of a cell; calculation according to a C-RNTI allocated to a UE by a cell; obtaining according to a timeslot index; and obtaining according to an index of the TTI.

Alternatively, when the predefined pattern is an RS time frequency structure, step 102 may include the sub-step as follows.

The RS is sent by at least using a symbol duration, the RS time frequency structure being used to represent ACK information or NACK information in the information, wherein the RS time frequency structure includes: different symbol positions used by RSs in time domain, or different contiguous subcarrier positions in frequency domain, or different comb subcarrier offsets in frequency domain.

Alternatively, the method may further include the step as follows.

Channel state information is transmitted on the preset time-frequency domain resource, the channel state information including at least one of the following: CQI, PMI, or RI.

Herein, when at least one piece of information included in the channel state information and ACK or NACK included in the information are transmitted simultaneously, independent coding modulation or joint coding modulation is used.

According to an information transmission method provided in the embodiments of the disclosure, firstly, a predefined pattern for carrying information is determined, the predefined pattern includes a predefined sequence or a predefined RS time frequency structure; and then, the predefined pattern carrying the information is transmitted on a preset time-frequency domain resource.

Figure 2:
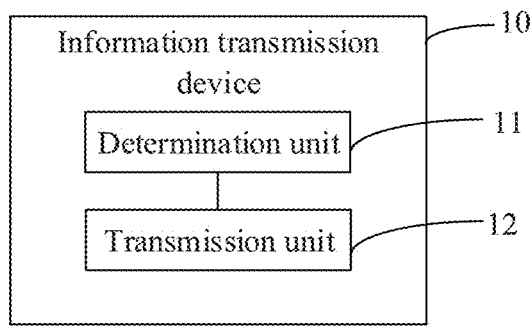
FIG. 2 is a structure diagram of a device for transmitting information according to embodiments of the disclosure.

The embodiments of the disclosure also provide a device 10 for transmitting information. As shown in FIG. 2, the device 10 may be arranged in a UE, and includes a determination unit 11 and a transmission unit 12.

The determination unit 11 is arranged to determine a predefined pattern for carrying information, wherein the predefined pattern includes a predefined sequence or a predefined RS time frequency structure.

The transmission unit 12 is arranged to transmit the predefined pattern carrying the information on a preset time-frequency domain resource.

The information includes ACK or NACK.

Alternatively, when the predefined pattern is the predefined sequence, the preset time-frequency domain resource includes a preset rime domain resource and a preset frequency domain resource, wherein the preset time domain resource includes a TTI with a duration of K symbols, where K is greater than of equal to 1 and smaller than or equal to 7, and K is a positive integer; and the preset frequency domain resource includes M subcarriers, the M subcarriers being mapped as a comb structure in frequency domain, wherein a frequency domain offset number N is an integral multiple of 2, and M is an integral multiple of 12. Alternatively. M may be 48 or 72.

Alternatively, the predefined sequence has a length L, which is an integral multiple of 12, a basic sequence of the predefined sequence includes a QPSK-based sequence or a ZC sequence, and a sequence in the predefined sequence is obtained based on the basic sequence.

Alternatively, when L is greater than 24, the basic sequence of the predefined sequence is the ZC sequence.

Alternatively, L is 24 or 36. When L is 24, the basic sequence of the predefined sequence is the QPSK-based sequence. When L is 36, the basic sequence of the predefined sequence is the ZC sequence.

Alternatively, the transmission unit 12 is arranged to:

transmit the predefined sequence according to a first preset rule by using the M subcarriers at the TTI with the duration of K symbols.

Herein, the first preset rule includes:

for each of the K symbols, using a different basic sequence for a corresponding predefined sequence to be transmitted in the symbol; or, for each of the K symbols, obtaining a corresponding predefined sequence to be transmitted in the symbol by performing a different cyclic shift on a same basic sequence.

Alternatively, the first preset rule further includes:

for each of the K symbols, using a different comb subcarrier offset of the M subcarriers; or, for each of the K symbols, using a same frequency domain subcarrier position; or, for the K symbols, using inter-symbol frequency hopping.

Alternatively, the transmission unit 12 is arranged to:

transmit the predefined sequence for each symbol of K symbols in the TTI in the following manner: transmitting sequences in the predefined sequence by using the M subcarriers in a preset 1-symbol duration.

Alternatively, the preset time domain resource is a TTI having a 1-symbol length, and when a UE needs to send an SRS at a frequency domain position Y whilst needing to send the information at a frequency domain position X, the transmission unit 12 is arranged to:

send the information at frequency domain positions Y or a subset of Y within the TTI having a 1-symbol length.

Herein, one or more sequences transmitted at the frequency domain positions Y or the subset of Y and used for carrying the information are sequences used for transmitting the information at frequency domain positions X, or a repetition of sequences used for transmitting the information at frequency domain positions X, or truncation of sequences used for transmitting the information at frequency domain positions X, or punching of sequences used for transmitting the information at frequency domain positions X, or redefined sequences.

Alternatively, an index of the basic sequence is acquired in at least one of the following manners: allocation by a base station; calculation according to a physical layer cell identity of a cell; obtaining according to a timeslot index; and obtaining according to an index of the TTI.

An index of the cyclic shift is acquired in at least one of the following manners: allocation by a base station; calculation according to a physical layer cell identity of a cell; calculation according to a C-RNTI allocated to a UE by a cell; obtaining according to a timeslot index; and obtaining according to an index of the TTI.

Alternatively, when the predefined pattern is an RS time frequency structure, the transmission unit 12 is arranged to:

send the RS by at least using a symbol duration, the RS time frequency structure being used to represent ACK information or NACK information in the information, where the RS time frequency structure includes: different symbol positions used by RSs in time domain, or different contiguous subcarrier positions in frequency domain, or different comb subcarrier offsets in frequency domain.

Alternatively, the transmission unit 12 may be further arranged to:

transmit channel state information on the preset time-frequency domain resource, the channel state information including at least one of: CQI, PMI, or RI.

Herein, when at least one piece of information included in the channel state information and ACK or NACK included in the information are transmitted simultaneously, independent coding modulation or joint coding modulation is used.

The present embodiment is used to implement each of the above-mentioned method embodiments. A working flow and a working principle of each unit in the present embodiment are determined by description in each of the above-mentioned method embodiments, and will not be elaborated herein.

According to a device for transmitting information provided in the embodiments of the disclosure, a predefined pattern for carrying information is determined, the predefined pattern includes a predefined sequence or a predefined RS time frequency structure; and the predefined pattern carrying the information is transmitted on a preset time-frequency domain resource. By means of the embodiments of the disclosure, ACK/NACK can be transmitted even when the length of a TTI is shortened in time domain, it is convenient for a receiver to demodulate a predefined pattern without reference information, a hopping gain can be easily achieved, and information can be implicitly transmitted by fully utilizing the positions of RSs to improve the utilization rate of resources.

In order to make a person skilled in the art more clearly understand the technical solutions provided in the disclosure, the technical solutions provided in the disclosure will be described below by means of specific embodiments in detail.

Embodiment 1

Figure 3:
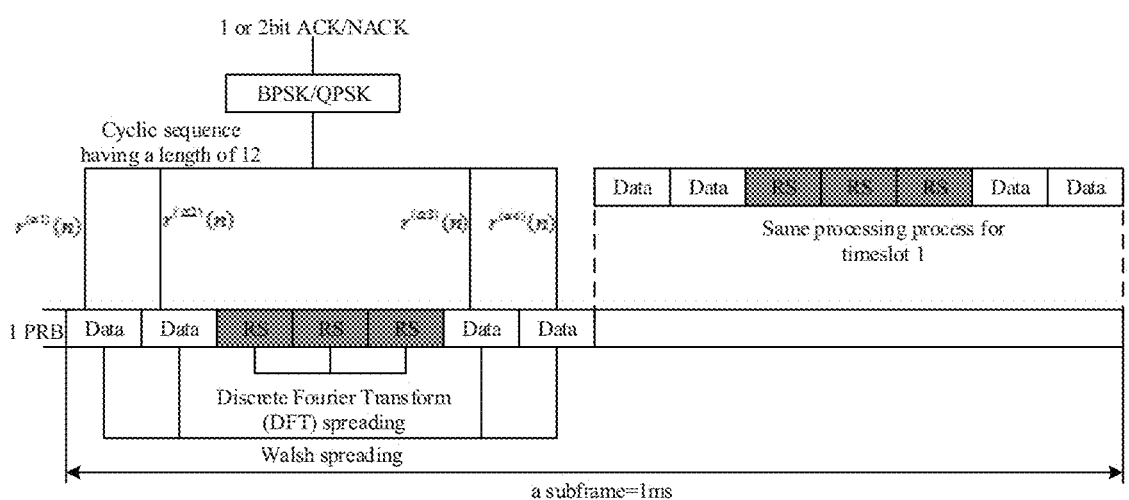
FIG. 3 is an ACK/NACK transmission structure for a related TTI=1 ms PUCCH Format 1/1a/1b with a conventional Cyclic Prefix (CP).

FIG. 3 shows an ACK/NACK transmission structure for a related TTI=1 ms PUCCH Format 1/1a/1b with a conventional CP. In a related PUCCH structure, a subframe is occupied in time domain, a PRB is occupied in frequency domain, and inter-timeslot hopping is used. Different cells adopt group hopping to select different QPSK-based basic sequences, and a group hopping period is a timeslot. In the figure, $r^{(\alpha i)}(n)$ represents a sequence obtained by performing a different cyclic shift on a QPSK basic sequence on each symbol, where n=0, 1, 2, . . . , 11, representing an index of a sequence element, αi represents a phase rotation amount or a time domain cyclic shift amount of a corresponding sequence on a symbol i on the basis of the basic sequence, and i=1, 2, 3, 4. For different symbols within a same timeslot, a time domain randomization method is employed to obtain different cyclic shift sequences of an identical basic sequence. In addition, in a related structure, a time domain spreading method is employed to increase the number of multiplexing users. However, when a short TTI technology is used to implement delay reduction, the TTI has a length of merely 1 to 7 Single-Carrier Frequency-Division Multiple Access (SC-FDMA) symbols. A related timeslot-based hopping structure and time domain spreading structure cannot be applied.

Figure 4:
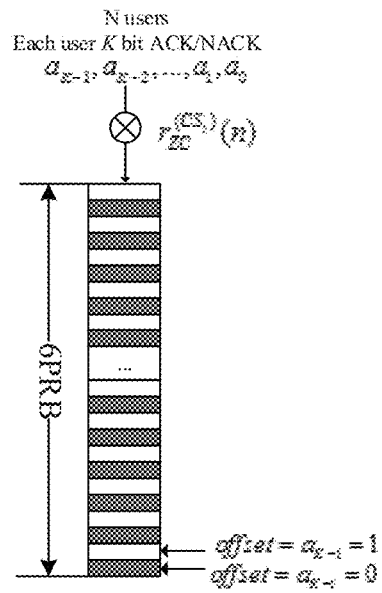
FIG. 4 is a sending diagram of K-bit ACK/NACK fed back in a PUCCH when a TTI occupies a single symbol length according to an embodiment of the disclosure.

FIG. 4 shows a sending diagram of K-bit ACK/NACK fed back in a PUCCH when a TTI adopts a single symbol length. In FIG. 4, N UEs send ACK/NACK messages, each UE feeding back K-bit ACK/NACK, respectively represented by $a_{K-1}, a_{K-2}, \ldots, a_1, a_0$, where ACK at a corresponding bit position is represented by "1", and NACK is represented by "0". A basic sequence adopts cyclic extension of a ZC sequence having a length which is 36, and $M=2^{K-1}$ different cyclic shifts, respectively represented by $CS_0, CS_1, \ldots, CS_i, \ldots, CS_{2^{K-1}-1}$, are allocated to each user. ACK/NACK information of each user is mapped to comb subcarriers in frequency domain, a comb subcarrier offset in frequency domain is offset=0 or 1, and a PUCCH occupies 6 PRBs. Further, a decimal number corresponding to a binary sequence formed by $a_{K-2}, \ldots, a_1, a_0$ is defined as i.

An ACK/NACK sending rule is: when K>1, a comb subcarrier offset satisfies offset=$a_{K-1}$, and $a_{K-2}, \ldots, a_1, a_0$ is represented by a cyclic shift $CS_i$. When K=1, a comb subcarrier offset satisfies offset=$a_{K-1}$, and an used cyclic shift is $CS_0$. When a 1-bit ACK message is sent, the ACK message is sent at a comb position with a subcarrier offset satisfying offset=1 by using the cyclic shift $CS_0$. When 4-bit ACK/NACK is sent, 7 cyclic shifts are allocated. If 0001 is sent, 0001 is sent at a comb position with a subcarrier offset satisfying offset=0 by using the cyclic shift $CS_1$. Meanwhile, it is considered that the probability of transmitting ACK is usually much higher than the probability of transmitting NACK, and when the number of 1 in $a_{K-2}, \ldots, a_1, a_0$ is large, a cyclic shift with better correlation is correspondingly used. Or, it is considered that the target probability of correct NACK demodulation is higher, and when the number of 0 in $a_{K-2}, \ldots, a_1, a_0$ is large, a cyclic shift with better correlation is correspondingly used.

Herein, ACK/NACKs of different users are distinguished by different cyclic shifts of a same ZC sequence. Cyclic shift indexes used by different UEs may be allocated by a base station, or obtained according to a physical layer cell identity of a cell, or calculated according to C-RNTIs allocated to UEs by a cell, or obtained according to a TTI index, or obtained by combining the above-mentioned factors.

In addition, in order to implement simultaneous transmission of SRSs only sent by a user and ACK/NACK messages of other users, different comb subcarrier offsets may be used, or the same comb subcarrier offset but different cyclic shifts may be used.

The advantages of the present embodiment are as follows.

A comb subcarrier mapping mode contributes to increase of a diversity gain in frequency domain, reduces the number of bits for representing ACK/NACK by using a cyclic shift, is convenient for synchronization, and may be used for rapid ACK/NACK feedback during out of synchronization of the uplink.

The comb subcarrier mapping mode may implement simultaneous transmission of an ACK/NACK message and SRSs of other UEs at the same frequency domain position.

A ZC sequence with better correlation reduces interference of the ACK/NACK message between UEs.

Embodiment 2

Figure 5:
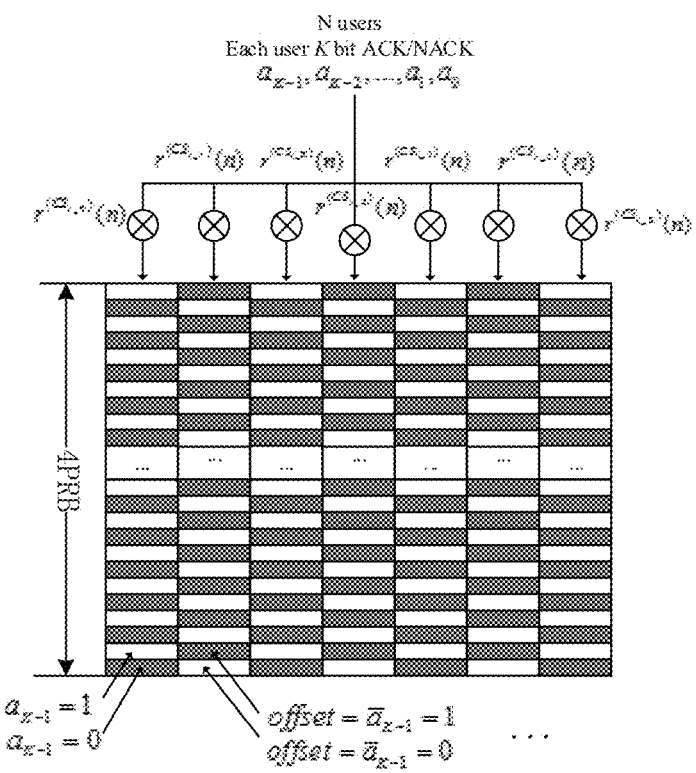
FIG. 5 is a sending diagram of K-bit ACK/NACK fed back in a PUCCH when a TTI occupies a 7-symbol length according to an embodiment of the disclosure.

FIG. 5 shows a sending diagram of K-bit ACK/NACK fed back in a PUCCH when a TTI occupies a 7-symbol length. In FIG. 5, N UEs send uplink ACK/NACK messages, each UE feeding back K-bit ACK/NACK, respectively represented by $a_{K-1}, a_{K-2}, \ldots, a_1, a_0$. A basic sequence is a QPSK random sequence having a length which is 24, and $M=2^{K-1}$ different cyclic shifts, respectively represented by $CS_{s,0}, CS_{s,1}, \ldots, CS_{s,i}, \ldots, CS_{s,2^{K-1}-1}$, are allocated to each SC-FDMA symbol of each user, where s represents a symbol index which is an integer within a value range of 0 to 7, and i is a cyclic shift index within a value range of 0 to $2^{K-1}-1$. In the figure, $r^{(CS_{s,i})}(n)$ represents a sequence obtained by performing a different cyclic shift on a QPSK basic sequence on each symbol, where n=0, 1, 2, . . . , 11, and n represents an index of a sequence element. A PUCCH occupies 4 PRBs in frequency domain. ACK/NACK information on each symbol is mapped to a comb subcarrier in frequency domain, and a comb subcarrier offset in frequency domain is represented as offset, calculated by the following formula:

$$\text{offset}(s) = \begin{cases} a_{K-1} & s \text{ is an even number} \\ \bar{a}_{K-1} & s \text{ is an odd number} \end{cases} \quad (1)$$

where $\bar{a}_{K-1}$ represents NOT of $a_{K-1}$. Further, a decimal number corresponding to a binary sequence formed by $a_{K-2}, \ldots, a_1, a_0$ is defined as i. At an $s^{th}$ symbol position, an ACK/NACK sending rule is: when K>1, $a_{K-1}$ is represented by using a comb subcarrier offset offset(s), and $a_{K-2}, \ldots, a_1, a_0$ is represented by using a cyclic shift $CS_{s,i}$. When K=1, $a_{K-1}$ is represented by using a comb subcarrier offset offset(s), and the cyclic shift used is $CS_{s,0}$.

Herein, ACK/NACKs of different users are distinguished by different cyclic shifts of an identical ZC sequence, and comb offsets of different users at the same symbol position may be the same or different.

Herein, cyclic shift indexes and comb offsets used on each SC-FDMA symbol of different UEs may be allocated by a base station, or obtained according to a physical layer cell identity of a cell, or calculated according to C-RNTIs allocated to UEs by a cell, or obtained according to a TTI index, or obtained by combining the above-mentioned factors.

The advantages of the present embodiment are as follows.

A comb subcarrier mapping mode contributes to increase of a diversity gain in frequency domain, reduces the number of bits for representing ACK/NACK by using a cyclic shift, is convenient for synchronization, and may be used for rapid ACK/NACK feedback during out of synchronization of the uplink.

Cyclic shifts and comb offsets used by each UE between different symbols are variable, thereby reducing interference of ACK/NACK messages between different UEs.

Embodiment 3

Figure 6:
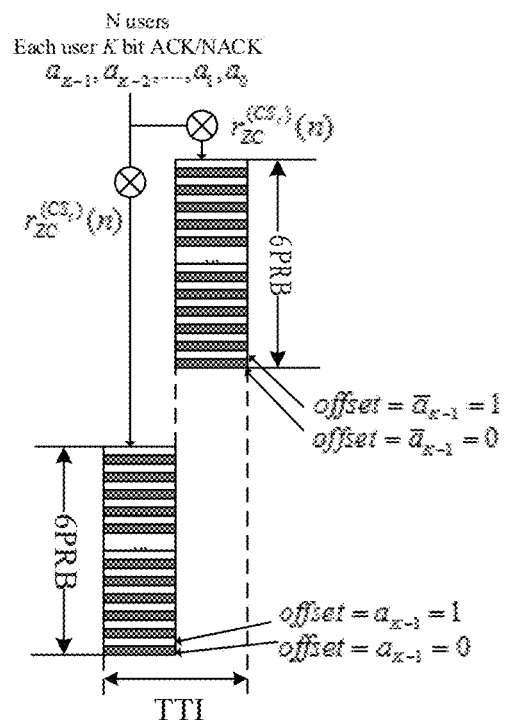
FIG. 6 is a sending diagram of K-bit ACK/NACK fed back in a PUCCH when a TTI occupies a 2-symbol length according to an embodiment of the disclosure.

FIG. 6 shows a sending diagram of K-bit ACK/NACK fed back in a PUCCH when a TTI occupies a 2-symbol length. In FIG. 6, N UEs send uplink ACK/NACK messages, each UE feeding back K-bit ACKs/NACKs, respectively represented by $a_{K-1}, a_{K-2}, \ldots, a_1, a_0$. A basic sequence adopts cyclic extension of a ZC sequence having a length $N_{ZC}=36$, and $M=2^{K-1}$ different cyclic shifts, respectively represented by $CS_{s,0}, CS_{s,1}, \ldots, CS_{s,i}, \ldots, CS_{s,2^{K-1}-1}$, are allocated to each user, where s represents a symbol index 0 or 1. ACK/NACK information of each user is mapped to different frequency domain positions of two SC-FDMA symbols, frequency domain indexes are $n_{r,s}$ respectively, namely hopping exists between symbols, and each hopping position occupies 6 PRBs. Each symbol is mapped as a comb structure, and a comb subcarrier offset in frequency domain is offset. When s=0, offset=$a_{K-1}$; and when s=1, offset=$\bar{a}_{K-1}$.

Further, a decimal number corresponding to a binary sequence formed by $a_{K-2}, \ldots, a_1, a_0$ is defined as i, a decimal number corresponding to a binary sequence formed by $a_0$, $a_1, \ldots, a_{K-2}$ is defined as j, and an ACK/NACK sending rule is as follows.

At an $s^{th}$ symbol position, ACK/NACK is sent at a frequency domain index $n_{r,s}$, and when K>1, $a_{K-1}$, may be represented by using a comb subcarrier offset offset; when s=0, $a_{K-2}, \ldots, a_1, a_0$ is represented by using a cyclic shift $CS_{s,i}$, and when s=1, $a_{K-2}, \ldots a_1, a_0$ is represented by using a cyclic shift $CS_{s,j}$. When K=1, $a_{K-1}$ may be represented by using a comb subcarrier offset offset, and a cyclic shift used is $CS_{s,0}$.

Herein, ACKs/NACKs of different users are distinguished by different cyclic shifts of an identical ZC sequence. Cyclic shift indexes used by different UEs may be allocated by a base station, or obtained according to a physical layer cell identity of a cell, or calculated according to C-RNTIs allocated to UEs by a cell, or obtained according to a TTI index, or obtained by combining the above-mentioned factors.

The advantages of the present embodiment are as follows.

A comb subcarrier mapping mode contributes to increase of a diversity gain in frequency domain, reduces the number of bits for representing ACKs/NACKs by using a cyclic shift, is convenient for synchronization, and may be used for rapid ACK/NACK feedback during out of synchronization of the uplink.

A ZC sequence with better correlation reduces interference of ACK/NACK messages between UEs.

Hopping between symbols increases a hopping gain.

Embodiment 4

Figure 7:
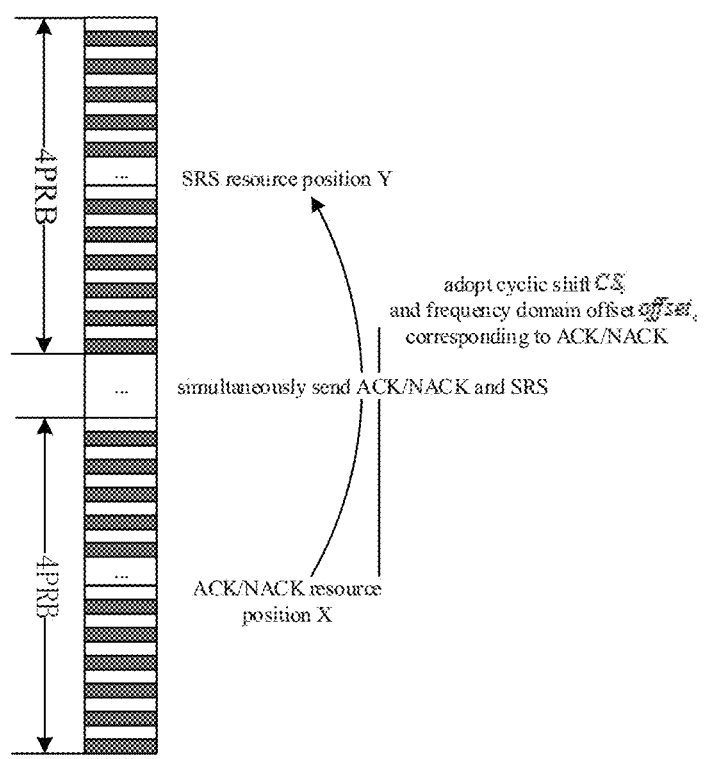
FIG. 7 is a diagram of joint transmission of K-bit ACK/NACK fed back in a PUCCH and an SRS when a TTI occupies a single symbol length according to an embodiment of the disclosure, where the ACK/NACK and the SRS adopt the same sequence length.

FIG. 7 shows a diagram of joint transmission of K-bit ACK/NACK fed back in a PUCCH and an SRS when a TTI has a single symbol length. In FIG. 7, a frequency domain positions allocated to the ACK/NACK within this TTI symbol are X, a frequency domain positions allocated to the SRS are Y, and both PUCCH and SRS occupy 4 PRBs in frequency domain. There are N UEs, each UE feeding back K-bit ACK/NACK, respectively represented by $a_{K-1}$, $a_{K-2}, \ldots, a_1, a_0$. The ACK/NACK and the SRS adopt an identical QPSK-based basic sequence having a length which is $L_1=L_2=24$. $M=2^{K-1}$ different cyclic shifts, respectively represented by $CS_0, CS_1, \ldots, CS_i, \ldots, CS_{2^{K-1}-1}$, are allocated to each user to transmit the ACK/NACK. ACK/NACK information of each user is mapped to comb-structure subcarriers, and a comb subcarrier offset in frequency domain is offset=0 or 1.

If a cyclic shift corresponding to $a_{K-1}, a_{K-2}, \ldots, a_1, a_0$ sent by a UE is $CS_i$ and a comb subcarrier offset in frequency domain is $offset_i$, a rule of sending ACK/NACK by the UE is: if only the ACK/NACK is to be sent in the current TTI symbol, the ACK/NACK is sent at the frequency domain positions X by using the cyclic shift $CS_i$ and the domain offset $offset_i$; and if both the ACK/NACK and the SRS are sent simultaneously in a current TTI symbol, the ACK/NACK is sent at the frequency domain positions Y by using the cyclic shift $CS_i$ and the domain offset $offset_i$.

An alternative solution for a group hopping method and a cyclic shift selection method in the present embodiment is provided respectively below.

Herein, a basic sequence index used by each UE may be obtained by the following group hopping method:

$$u = \left( f_{gh}\left(\left\lfloor \frac{t_s}{\Delta_{ts}} \right\rfloor\right) + fss \right) \bmod 30 \quad (1)$$

where $t_s$ is a TTI index within a value range of 0, 1, 2, . . . , 139, $\Delta_{ts}$ represents a group hopping period, and $\Delta_{ts}$ is obtained by high-layer configuration.

$$f_{gh}(f) = \begin{cases} 0 & \text{group hopping disabled,} \\ (\Sigma_{i=0}^{n} c(8t+i) \cdot 2^i) \bmod 30 & \text{group hopping enabled.} \end{cases} \quad (2)$$

c(i) is a pseudorandom sequence defined in a 3GPP TS 36.211, and initialization data used here is $$c_{init} = \left\lfloor \frac{N_{ID}^{cell}}{30} \right\rfloor, \quad fss = N_{ID}^{cell} \bmod 30,$$

and $N_{ID}^{cell}$ is a physical layer cell identity within a value range of 0 to 503.

Assuming $\Delta_{ts}=N_{symb}^{UL}$, where $N_{symb}^{UL}$ is the number of SC-FDMA symbols within each timeslot, synchronization between ACK/NACK group hopping and related SRS group hopping based on a single symbol TTI can be implemented. That is, within the same cell, ACK/NACK information and SRSs adopt the same basic sequence.

A cyclic shift used by each UE may be determined by using the following algorithm:

$$CS_i(t_s) = 2\pi \cdot n_i(t_s)/L_1 \quad (2)$$

$$n_i(t_s) = [n_i'(t_s) \cdot \Delta_{shift}^{PUCCH}] \bmod L_1$$

$$n_i'(t_s) = \left(\left\lfloor \frac{L_1}{2^{k-1}} \right\rfloor + n_0'(t_s)\right) \bmod L_1 \quad i = 1, 2, \ldots, 2^{k-1}-1 \quad (3)$$

$$n_0'(t_s) = n_{PUCCH}^{(1,\tilde{p})} \bmod N, \quad N = \left\lfloor \frac{L_1}{2^{k-1} * \Delta_{shift}^{PUCCH}} \right\rfloor$$

where $CS_i(t_s)$ represents an $i^{th}$ cyclic shift used by a UE within a TTI of which an index is $t_s$, $n_i(t_s)$ represents a corresponding cyclic shift index, $n_{PUCCH}^{(1,\tilde{p})}$ is a resource channel index, and is associated with a C-RNTI allocated to a UE by a cell, and $\Delta_{shift}^{PUCCH}$ is a cyclic shift interval. If each user sends 2-bit ACK/NACK, $\Delta_{shift}^{PUCCH}=3$, and the length of a basic sequence is $L_1=24$, the supported number N of multiplexing users can be 4, and two cyclic shifts are to be allocated to each UE. Intermediate values $n^{0'}(t_s)$ corresponding to different UEs may be 0, 1, 2, 3. Indexes $n_0(t_s)$ corresponding to $0^{th}$ cyclic shifts of 4 UEs are 0, 3, 6, 9 respectively, and indexes $n_1(t_s)$ corresponding to first cyclic shifts are 12, 15, 18, 21 respectively, that is, two cyclic shifts used by 4 UEs are: (0, 12), (3, 15), (6, 18), (9, 21) respectively.

The method for determining group hopping and the cyclic shift are only an alternative solution of the present embodiment. Basic sequences, cyclic shifts and comb offsets used by different UEs may also be allocated by a base station, or obtained according to a physical layer cell identity of a cell, or calculated according to C-RNTIs allocated to UEs by a cell, or obtained according to a TTI index, or obtained by combining the above-mentioned factors.

The advantages of the present embodiment are as follows.

A comb subcarrier mapping mode contributes to increase of a diversity gain in frequency domain, reduces the number of bits for representing ACK/NACK by using a cyclic shift, is convenient for synchronization, and may be used for rapid ACK/NACK feedback during out of synchronization of the uplink.

Compatible coexistence of basic sequence group hopping and frequency domain hopping for ACK/NACK information and SRS information is implemented, and simultaneous transmission of the ACK/NACK information and the SRS information can be implemented.

The cyclic shift determination method provided in the present embodiment may uniformly discretize cyclic shift intervals of different UEs, thereby reducing interference between different UEs.

Embodiment 5

Figure 8:
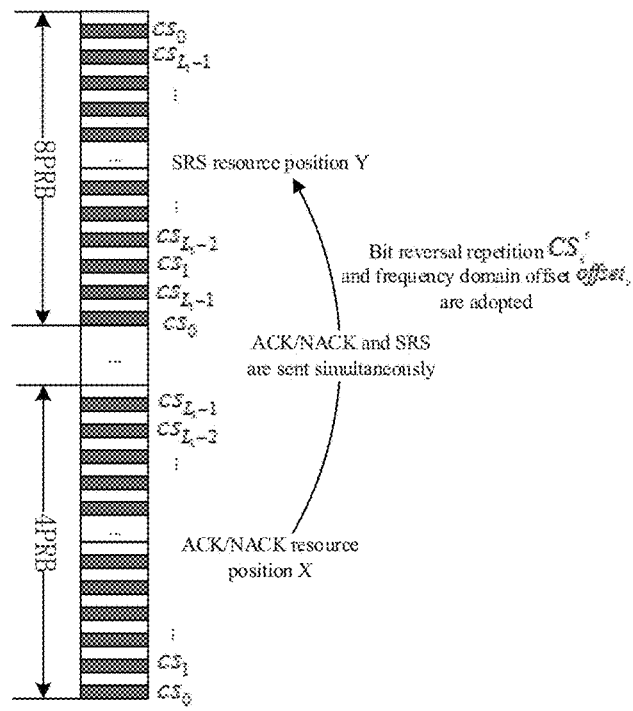
FIG. 8 is a diagram of joint transmission of K-bit ACK/NACK fed back in a PUCCH and an SRS when a TTI occupies a single symbol length according to an embodiment of the disclosure, where the ACK/NACK and the SRS adopt different sequence lengths.

FIG. 8 shows an example of joint transmission of a K-bit ACK/NACK message fed back in a PUCCH and an SRS when a TTI has a single symbol length. It is assumed that frequency domain positions allocated to ACK/NACK within a TTI symbol are X, frequency domain positions allocated to SRSs are Y, a PUCCH occupies 4 PRBs in frequency domain, and SRSs occupy 8 PRBs in frequency domain. In FIG. 8, there are N UEs, each UE feeding back K-bit ACK/NACK, respectively represented by $a_{K-1}, a_{K-2}, \ldots, a_1, a_0$. The ACK/NACK adopts a QPSK-based basic sequence of which the length is $L_1=24$, and the SRS adopts a ZC basic sequence of which the length is $L_2=48$. $M=2^{K-1}$ different cyclic shifts, respectively represented by $CS_0, CS_1, \ldots, CS_i, \ldots, CS_{2^{K-1}-1}$, are allocated to each user to transmit the ACK/NACK. ACK/NACK information of each user is mapped to comb-structure subcarriers, and a comb subcarrier offset in frequency domain is offset=0 or 1.

It is assumed that a cyclic shift corresponding to $a_{K-1}, a_{K-2}, \ldots, a_1, a_0$ sent by a UE is $CS_i$ and a comb subcarrier offset in frequency domain is $offset_i$. A bit reversal repetition sequence of sequence $CS_i$ is defined as $CS_i'$, which is calculated as:

$$\begin{cases} CS_i'(2k) = CS_i'(k) \\ CS_i'(2k+1) = CS_i'(L_1 + 1 - k) \end{cases} \quad (4)$$

$$k = 0, 1, 2, \ldots, L_1 - 1$$

A rule of sending ACK/NACK by the UE is: if only the ACK/NACK is sent in a current TTI symbol, the ACK/NACK is sent at the frequency domain positions X by using the cyclic shift $CS_i$ and the domain offset $offset_i$; and if the ACK/NACK and the SRS are sent simultaneously in the current TTI symbol, the ACK/NACK is sent at the frequency domain positions Y by using the bit reversal repetition $CS_i'$ and the domain offset $offset_i$.

Herein, basic sequences, cyclic shifts and comb offsets used by different UEs may also be allocated by a base station, or obtained according to a physical layer cell identity of a cell, or calculated according to C-RNTIs allocated to UEs by a cell, or obtained according to a TTI index, or obtained by combining the above-mentioned factors.

The advantages of the present embodiment are as follows.

A comb subcarrier mapping mode contributes to increase of a diversity gain in frequency domain, reduces the number of bits for representing ACK/NACK by using a cyclic shift, is convenient for synchronization, and may be used for rapid ACK/NACK feedback during out of synchronization of the uplink.

Compatible coexistence of basic sequence group hopping and frequency domain hopping for ACK/NACK information and SRS information is implemented, and simultaneous transmission of the ACK/NACK information and the SRS information can be implemented.

The bit reversal repetition sequence designed in the present embodiment has a better peak-to-average ratio.

Embodiment 6

Figure 9:
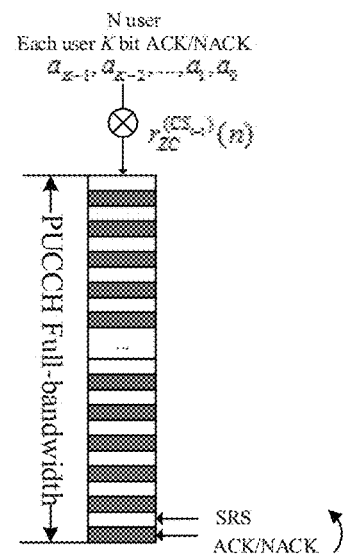
FIG. 9 is a sending example of joint transmission of full-bandwidth mapped ACK/NACK and an SRS when a TTI occupies a single symbol length according to an embodiment of the disclosure.

FIG. 9 shows a sending diagram of joint transmission of a full-bandwidth mapped ACK/NACK message and an SRS when a TTI occupies a single symbol length. In FIG. 9, a PUCCH bandwidth is B MHz, totally used for bearing an ACK/NACK message and an SRS message. Each UE feeds back K-bit ACK/NACK, respectively represented by $a_{K-1}, a_{K-2}, \ldots, a_1, a_0$. The ACK/NACK and the SRS adopt the same basic sequence adopting cyclic extension of a ZC sequence. $2^K-1$ different cyclic shifts, respectively represented by $CS_0, CS_1, \ldots, CS_i, \ldots, CS_{2^K-2}$, are allocated to each user to represent the ACK/NACK, and a cyclic shift, represented by $CS_{SRS}$, is allocated to each user to represent the SRS. ACK/NACK information and SRS information of each user are mapped to comb subcarriers in frequency domain, a comb subcarrier offset of the ACK/NACK in frequency domain is offset=0, and a comb subcarrier offset of the SRS in frequency domain is offset=1. Further, a decimal number corresponding to a binary sequence formed by $a_{K-2}, \ldots, a_1, a_0$ is defined as i.

A rule of sending ACK/NACK by a UE is: if only the ACK/NACK is sent in a current TTI symbol, when i=0, any information is not sent at the subcarrier offset offset in frequency domain=0; and when i>0, $a_{K-1}, a_{K-2}, \ldots, a_1, a_0$ is represented by using a cyclic shift $CS_{i-1}$ at the subcarrier offset offset=0 in frequency domain. If a current TTI symbol sends the ACK/NACK and the SRS simultaneously, when i=0, any information is not sent at the subcarrier offset offset=1 in frequency domain; and when i>0, $a_{K-1}, a_{K-2}, \ldots, a_1, a_0$ is represented by using a cyclic shift $CS_{i-1}$ at the subcarrier offset offset=1 in frequency domain.

Herein, ACK/NACKs between different users and SRSs between different users are distinguished by using different cyclic shifts of an identical ZC sequence. Cyclic shift indexes used by different UEs may be allocated by a base station, or calculated according to C-RNTIs of a cell, or calculated according to C-RNTIs allocated to UEs by a cell, or obtained according to a TTI index, or obtained by combining the above-mentioned factors.

Embodiment 7

Figure 10:
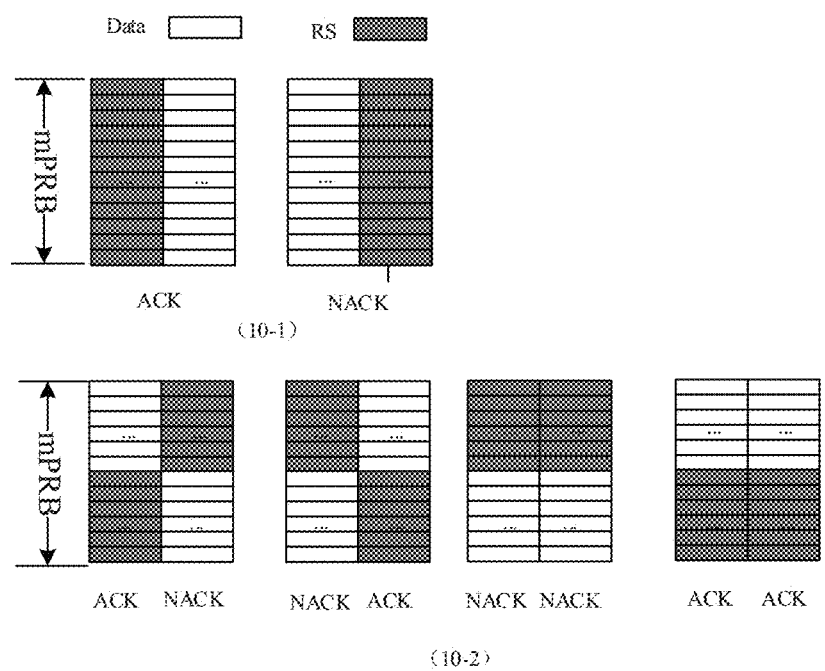
FIG. 10 is a sending diagram of 1-2 bit ACK/NACK fed back in a PUCCH when a TTI occupies a 2-symbol length according to an embodiment of the disclosure.

FIG. 10 shows a sending diagram of 1-2 bit ACK/NACK messages fed back in a PUCCH when a TTI occupies a 2-symbol length. 1-2 bit ACK/NACK messages are implicitly represented by mapping RSs to different symbols or different subcarrier positions, where Data may be used to transmit other signaling in a PUCCH such as CQI/PMI/RI.

When only 1-bit ACK/NACK information is fed back, the information may be sent by using the structure as shown in FIG. 10-1. For example, a receiver may determine whether ACK or NACK is fed back by blindly detecting two positions of an RS. The two positions may be determined according to, not limited to a symbol position of ACK/NACK, or may be implicitly determined by mapping the RS to non-contiguous comb subcarriers via different offsets of the comb subcarriers.

When 2-bit ACK/NACK information is to be fed back, the structure as shown in FIG. 10-2 or the structure combined with the structure as shown in FIG. 10-1 may be used. For example, a receiver may determine fed-back 2-bit ACK/

NACK information by blindly detecting four positions of an RS. The four positions are not limited to the structure as shown in FIG. 10, or are implicitly determined by mapping the RS to non-contiguous comb subcarriers via different offsets of the comb subcarriers.

The implicit transmission used in the present embodiment is advantageous in that ACK/NACK information can be effectively fed back without additional time-frequency resources.

Embodiment 8

Figure 11:
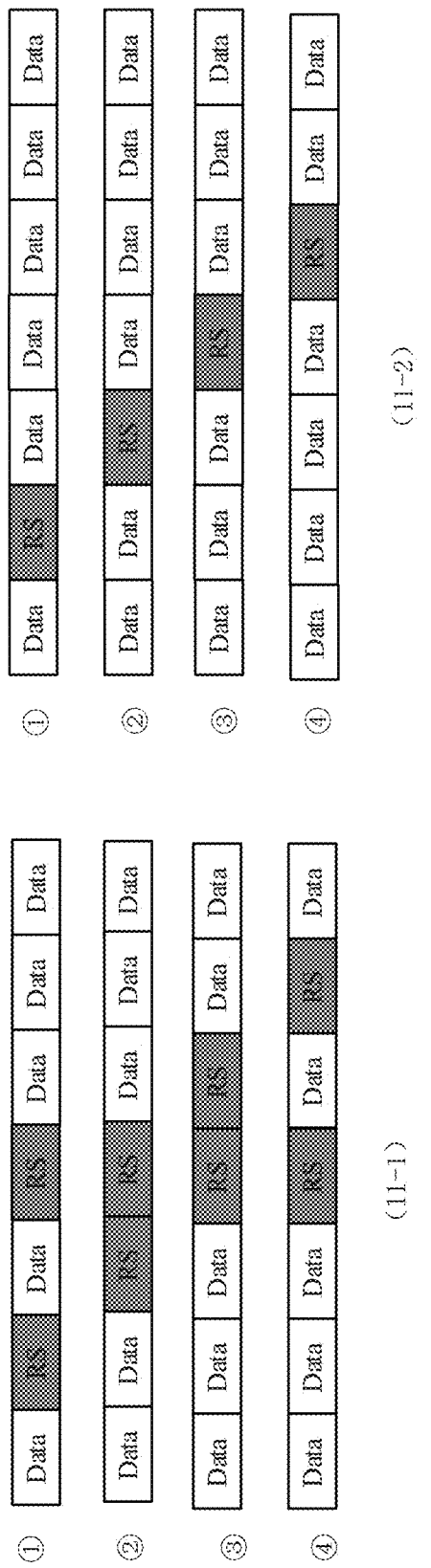
FIG. 11 is a sending diagram of 1-2 bit ACK/NACK fed back in a PUCCH when a TTI occupies a 7-symbol length according to an embodiment of the disclosure.

FIG. 11 shows a sending diagram of 1-2 bit ACK/NACK messages fed back in a PUCCH when a TTI occupies a 7-symbol length. 1-2 bit ACK/NACK information is implicitly represented by different mapping symbol positions of an RS, where Data may be used to transmit other signaling of a PUCCH, such as CQI/PMI/RI.

1-2 bit ACK/NACK information is implicitly represented by different RS positions preferentially, but not limited to the following RS mapping positions. FIG. 11-1 shows an alternative pattern of two RS positions, and FIG. 11-2 shows an alternative pattern containing only one RS. In order to avoid conflict between Data and the RS at the same position, it may be defined that the Data and the RS are distinguished by using different cyclic shifts.

Herein, basic sequences and cyclic shifts used by data symbols and RSs of different UEs may be allocated by a base station, or calculated according to C-RNTIs of a cell, or calculated according to C-RNTIs allocated to UEs by a cell, or obtained according to a TTI index, or obtained by combining the above-mentioned factors.

In FIG. 11-2, a corresponding relationship between different RS positions and ACK/NACK may be as follows.

When 2-bit ACK/NACK information is to be fed back, 2-bit NACK information is represented by ①, and 2 bit ACK information is represented by ④. That is, an RS position corresponding to the NACK information should be near the front as much as possible, thereby reducing delay of data re-preparation by an eNB for NACK feedback.

Or, when 2-bit ACK/NACK information is to be fed back, 2-bit ACK information is represented by ①, and 2-bit NACK information is represented by ④. That is, an RS position corresponding to the ACK information should be near the front as much as possible. Because the probability of ACK feedback is greater than the probability of NACK feedback, the statistic average delay is reduced.

The implicit transmission used in the present embodiment is advantageous in that ACK/NACK information can be effectively fed back without additional time-frequency resources. The present embodiment may also be applied to a related 1 ms PUCCH Format 2 structure.

The embodiments of the disclosure also provide a computer storage medium in which a computer-executable instruction is stored. The computer-executable instruction is used to execute the method in the above-mentioned embodiments.

Those of ordinary skill in the art may understand that all or some of the steps in the above-mentioned method may be completed by instructing related hardware (e.g., processor) through a program. The program may be stored in a computer-readable storage medium such as a read-only memory, a magnetic disk or an optical disk. Alternatively, all or some of the steps in the above-mentioned embodiments may be implemented by using one or more integrated circuits. Accordingly, each module/unit in the above-mentioned embodiments may be implemented in a form of hardware, and for example, corresponding functions thereof are implemented by means of an integrated circuit. Each module/unit may also be implemented in a form of software function module, and for example, corresponding functions thereof are implemented by executing programs/instructions stored in a memory by the processor. The disclosure is not limited to the combination of hardware and software in any specific form.

Although the implementation manner disclosed in the disclosure is as above, the content is only the implementation manner used for convenience of understanding the disclosure, not intended to limit the disclosure. Any person skilled in the art may make any modifications and changes about an implementation form and details without departing from the spirit and scope disclosed in the disclosure. However, the scope of patent protection of the disclosure must be determined with reference to the scope defined by the appended claims.

INDUSTRIAL APPLICABILITY

The above-mentioned technical solutions can more easily obtain a frequency division gain by carrying transmitted information in a predefined sequence when the length of a TTI is shortened in time domain, can implement ACK/NACK feedback in an out of synchronization state and implement simultaneous transmission with an SRS, and can implicitly transmit information by fully utilizing the positions of RSs to improve the utilization rate of resources.

The invention claimed is:

1. A method for information transmission, comprising:
   determining a predefined pattern for carrying information, wherein the predefined pattern comprises a predefined sequence, and the information comprises Acknowledgement (ACK) or Negative Acknowledgement (NACK); and
   transmitting the predefined pattern carrying the information on a preset time-frequency domain resource, wherein the information is indicated by at least one selected from a group consisting of different cyclic shift sequences of the predefined sequence and different comb subcarrier offsets in frequency domain of the preset time-frequency domain resource,
   wherein the preset time-frequency domain resource comprises a preset time domain resource and a preset frequency domain resource, the preset time domain resource comprises a Transmission Time Interval (TTI) with a duration of K symbols, and the preset frequency domain resource comprises M subcarriers, the M subcarriers being mapped as a comb structure in frequency domain;
   wherein the predefined sequence has a length L, which is an integral multiple of 12, a basic sequence of the predefined sequence comprises a Quadrature Phase Shift Keying (QPSK)-based sequence or a Zadoff-Chu (ZC) sequence, and a sequence in the predefined sequence is obtained based on the basic sequence;
   wherein transmitting the predefined pattern carrying the information on a preset time-frequency domain resource comprises:
   transmitting the predefined sequence according to a first preset rule, by using the M subcarriers, at the TTI with the duration of K symbols, wherein the first preset rule comprises: for each of the K symbols, using a different basic sequence for a corresponding predefined sequence to be transmitted in the symbol; or, for each of the K symbols, obtaining a corresponding predefined sequence to be transmitted in the symbol by performing a different cyclic shift on a same basic sequence;

wherein an index of the basic sequence is acquired in at least one of the following manners: allocation by a base station; calculation according to a physical layer cell identity of a cell; obtaining according to a timeslot index; and obtaining according to an index of the TTI; and wherein an index of the cyclic shift is acquired in at least one of the following manners: allocation by a base station; calculation according to a physical layer cell identity of a cell; calculation according to a Cell Radio Network Temporary Identity (C-RNTI) allocated to a User Equipment (UE) by a cell; obtaining according to a timeslot index; and obtaining according to an index of the TTI.

2. The method according to claim 1, wherein K is greater than or equal to 1 and smaller than or equal to 7, and is a positive integer, a frequency domain offset number N is an integral multiple of 2, and M is an integral multiple of 12, wherein a frequency domain offset indicates an offset of an initial subcarrier index relative to a lowest index of corresponding resource blocks where the M subcarriers being mapped as the comb structure in the frequency domain, and the frequency domain offset number is a total number of the frequency domain offsets.

3. The method according to claim 2, wherein M is 48 or 72.

4. The method according to claim 1, wherein when L is greater than 24, the basic sequence of the predefined sequence is the ZC sequence.

5. The method according to claim 1, wherein L is 24 or 36; when L is 24, the basic sequence of the predefined sequence is the QPSK-based sequence; and when L is 36, the basic sequence of the predefined sequence is the ZC sequence.

6. The method according to claim 1, wherein the first preset rule further comprises:
for each of the K symbols, using a different comb subcarrier offset of the M subcarriers; or,
for each of the K symbols, using a same frequency domain subcarrier position; or,
for the K symbols, using inter-symbol frequency hopping.

7. The method according to claim 1, wherein transmitting the predefined pattern carrying the information on a preset time-frequency domain resource comprises:
for each of the K symbols in the TTI, transmitting the predefined sequence in the following manner: transmitting a corresponding predefined sequence by using the M subcarriers in a preset 1-symbol duration.

8. The method according to claim 1, wherein the preset time domain resource is a TTI having a 1-symbol length, and when a Sounding Reference Signal (SRS) is sent at frequency domain positions Y whilst the information is sent at frequency domain positions X, transmitting the predefined pattern carrying the information on a preset time-frequency domain resource comprises:
sending the information at the frequency domain positions Y or a subset of Y within the TTI of the 1-symbol length,
wherein one or more sequences transmitted at the frequency domain positions Y or the subset of Y and used for carrying the information are sequences used for transmitting the information at frequency domain positions X, or a repetition of sequences used for transmitting the information at frequency domain positions X, or truncation of sequences used for transmitting the information at frequency domain positions X, or punching of sequences used for transmitting the information at frequency domain positions X, or redefined sequences.

9. The method according to claim 1, wherein the information is indicated by at least one selected from a group consisting of different cyclic shift sequences of the predefined sequence and different comb subcarrier offsets in frequency domain of the preset time-frequency domain resource comprises: the information is indicated by different cyclic shift sequences of the predefined sequence and different comb subcarrier offsets in frequency domain of the preset time-frequency domain resource.

10. The method according to claim 1, wherein the information is indicated by at least one selected from a group consisting of different cyclic shift sequences of the predefined sequence and different comb subcarrier offsets in frequency domain of the preset time-frequency domain resource comprises: the information is indicated by different cyclic shift sequences of the predefined sequence.

11. The method according to claim 1, wherein the information is indicated by at least one selected from a group consisting of different cyclic shift sequences of the predefined sequence and different comb subcarrier offsets in frequency domain of the preset time-frequency domain resource comprises: the information is indicated by different comb subcarrier offsets in frequency domain of the preset time-frequency domain resource.

12. A device for information transmission, comprising:
a processor; and
a memory storing instructions executable by the processor;
wherein the processor is arranged to:
determine a predefined pattern for carrying information, wherein the predefined pattern comprises a predefined sequence, and the information comprises Acknowledgement (ACK) or Negative Acknowledgement (NACK); and
transmit the predefined pattern carrying the information on a preset time-frequency domain resource, wherein the information is indicated by at least one selected from a group consisting of different cyclic shift sequences of the predefined sequence and different comb subcarrier offsets in frequency domain of the preset time-frequency domain resource,
wherein the preset time-frequency domain resource comprises a preset time domain resource and a preset frequency domain resource, the preset time domain resource comprises a Transmission Time Interval (TTI) with a duration of K symbols, and the preset frequency domain resource comprises M subcarriers, the M subcarriers being mapped as a comb structure in frequency domain;
wherein the predefined sequence has a length L, which is an integral multiple of 12, a basic sequence of the predefined sequence comprises a Quadrature Phase Shift Keying (QPSK)-based sequence or a Zadoff-Chu (ZC) sequence, and a sequence in the predefined sequence is obtained based on the basic sequence;
wherein the transmission unit is arranged to transmit the predefined sequence carrying the information on a preset time-frequency domain resource in the following manner:
transmitting the predefined sequence according to a first preset rule, by using the M subcarriers at the TTI with the duration of K symbols, wherein the first preset rule comprises: for each of the K symbols, using a different basic sequence for a corresponding predefined sequence to be transmitted in the symbol; or, for each of the K symbols, obtaining a corresponding predefined sequence to be transmitted in the symbol by performing a different cyclic shift on a same basic sequence;

wherein an index of the basic sequence is acquired in at least one of the following manners: allocation by a base station; calculation according to a physical layer cell identity of a cell; obtaining according to a timeslot index; and obtaining according to an index of the TTI; and wherein an index of the cyclic shift is acquired in at least one of the following manners: allocation by a base station; calculation according to a physical layer cell identity of a cell; calculation according to a Cell Radio Network Temporary Identity (C-RNTI) allocated to a User Equipment (UE) by a cell; obtaining according to a timeslot index; and obtaining according to an index of the TTI.

13. The device according to claim 12, wherein K is greater than or equal to 1 and smaller than or equal to 7, and K is a positive integer, a frequency domain offset number N is an integral multiple of 2, and M is an integral multiple of 12, wherein a frequency domain offset indicates an offset of an initial subcarrier index relative to a lowest index of corresponding resource blocks where the M subcarriers being mapped as the comb structure in the frequency domain, and the frequency domain offset number is a total number of the frequency domain offsets.

14. The device according to claim 12, wherein the processor is arranged to transmit the predefined sequence carrying the information on a preset time-frequency domain resource in the following manner:

for each of the K symbols in the TTI, transmitting the predefined sequence in the following manner: transmitting a corresponding predefined sequence by using the M subcarriers in a preset 1-symbol duration.

15. The device according to claim 12, wherein the preset time domain resource is a TTI having a 1-symbol length, and when a Sounding Reference Signal (SRS) is sent at frequency domain positions Y whilst the information is sent at frequency domain positions X, the processor is arranged to transmit the predefined sequence carrying the information on a preset time-frequency domain resource in the following manner:

sending the information at the frequency domain positions Y or a subset of Y within the TTI of the 1-symbol length, wherein one or more sequences transmitted at the frequency domain positions Y or the subset of Y and used for carrying the information are sequences used for transmitting the information at frequency domain positions X, or a repetition of sequences used for transmitting the information at frequency domain positions X, or truncation of sequences used for transmitting the information at frequency domain positions X, or punching of sequences used for transmitting the information at frequency domain positions X, or redefined sequences.

* * * * *